United States Patent
Boody et al.

(10) Patent No.: US 6,547,658 B2
(45) Date of Patent: Apr. 15, 2003

(54) DUAL BLADE LOIN KNIFE ASSEMBLY FOR AUTOMATIC LOIN PULLER APPARATUS

(75) Inventors: Lawrence D. Boody, Oliver Springs, TN (US); David L. Chappell, Loudon, TN (US)

(73) Assignee: Acraloc Corporation, Oak Ridge, TN (US)

( * ) Notice: Subject to any disclaimer, the term of this patent is extended or adjusted under 35 U.S.C. 154(b) by 0 days.

(21) Appl. No.: 09/928,025

(22) Filed: Aug. 10, 2001

(65) Prior Publication Data

US 2002/0019208 A1 Feb. 14, 2002

Related U.S. Application Data

(60) Provisional application No. 60/224,848, filed on Aug. 11, 2000.

(51) Int. Cl.$^7$ .............................. A22C 18/00; A22B 5/00
(52) U.S. Cl. ..................... 452/171; 452/136; 452/156; 452/150; 452/134
(58) Field of Search ................................ 452/171, 148, 452/136, 157

(56) References Cited

U.S. PATENT DOCUMENTS

| 1,079,114 A | 11/1913 | Davidson |
| 2,510,173 A | 6/1950 | Harter |
| 3,177,520 A | 4/1965 | Vogt |
| 3,352,011 A | 11/1967 | Alexander et al. |
| 3,546,737 A | 12/1970 | Neebel et al. |
| 3,605,178 A | 9/1971 | Hoffmann |
| 3,771,196 A | 11/1973 | Doerfer et al. |
| 3,789,456 A | 2/1974 | Doerfer et al. |
| 3,849,836 A | 11/1974 | Bernard et al. |
| RE28,508 E | * 8/1975 | Neebel et al. ............... 452/148 |
| 4,189,806 A | 2/1980 | Van Heynigen |
| 4,970,755 A | 11/1990 | LeBlanc |
| 4,974,290 A | 12/1990 | Cloninger |
| 4,979,269 A | 12/1990 | Norrie |
| 5,090,939 A | 2/1992 | Leblanc |
| 5,234,371 A | 8/1993 | Andre et al. |
| 5,295,898 A | 3/1994 | Andre et al. |
| 5,334,084 A | 8/1994 | O'Brien et al. |
| 5,407,384 A | * 4/1995 | Boody et al. ............... 452/134 |
| 5,476,417 A | 12/1995 | Long et al. |
| 5,514,032 A | * 5/1996 | Young et al. ............... 452/136 |
| 5,580,306 A | * 12/1996 | Young et al. ............... 452/148 |
| 5,725,424 A | 3/1998 | Dufour et al. |
| 5,882,252 A | * 3/1999 | Boody et al. ............... 452/136 |
| 5,902,177 A | * 5/1999 | Tessier et al. ............... 452/156 |
| 6,089,968 A | * 7/2000 | Andre et al. ................. 452/171 |
| 6,155,919 A | * 12/2000 | Haagensen et al. ......... 452/127 |

FOREIGN PATENT DOCUMENTS

| CA | 1079114 | 6/1980 |

* cited by examiner

Primary Examiner—Charles T. Jordan
Assistant Examiner—Susan C Alimenti
(74) Attorney, Agent, or Firm—Pitts & Brittian, P.C.

(57) ABSTRACT

An apparatus for positioning an animal carcass middle and for separating a loin and fatback portion from the carcass middle including a dual blade loin knife assembly for making appropriate cuts to separate the loin and fatback portion. The dual blade loin knife assembly includes a z-blade and a j-blade in which the z-blade separates the loin portion from the belly portion while leaving about a 2 inch to about a 2⅝ inch shelf on the belly portion incorporating an amount of "finger" lean while leaving a portion of finger lean on loin portion and the j-blade separates a selected depth of fatback from the loin portion based on the desired profile. The j-blade is positioned proximate the z-blade such that the carcass middle engages the j-blade subsequent to engagement of the z-blade. The dual blade loin knife assembly increases the useable size of a shelf cut on the belly portion of the carcass middle.

20 Claims, 10 Drawing Sheets

DUAL BLADE LOIN KNIFE ASSEMBLY FOR AUTOMATIC LOIN PULLER APPARATUS

CROSS-REFERENCE TO RELATED APPLICATIONS

This application claims the benefit of U.S. Provisional Application No. 60/224,848, filed Aug. 11, 2000.

STATEMENT REGARDING FEDERALLY SPONSORED RESEARCH OR DEVELOPMENT

Not Applicable

BACKGROUND OF INVENTION

1. Field of Invention

This invention relates to an apparatus used in the meat processing industry, and more particularly to an apparatus used to separate the loin portion of meat from carcass halves. Although the apparatus described herein was designed for the purpose of separating pork loins, it can be used for similar operations on other types of meat.

2. Description of the Related Art

In the field of meat processing, such as pork processing, it is well known that excess fat is removed from the back of the loin of a animal carcass to recover the loin before final cutting and/or packing the meat for market. Typically, the carcass of the animal is cut into two halves, and then cut transversely to remove the hind and fore quarters. The resulting portion is commonly referred to as the "middle" and will be referred to herein as the "carcass middle". Each carcass middle includes a loin to be removed from the back fat. The loin is adjacent to the belly and to the back bone, or chine, and is situated between the ribs and the outer layer of fat.

Various automatic devices have been developed to provide for the separation of the loins from the carcass middle. Typical of the art is the device disclosed in U.S. Pat. No. 4,189,806 issued to W. P. Van Heyningen on Feb. 26, 1980 and Canadian Patent No. 1,079,114 issued on Jun. 10, 1980. Both disclosed the same invention and, like other known devices at that time, required the carcass middle to be further subdivided prior to removal of the loin.

A device for accomplishing the automatic removal of the loin from a full carcass middle is described in U.S. Pat. No. 5,234,371 owned by a common assignee of the present invention. A further device for accomplishing the automatic removal of the loin from a full carcass middle is disclosed in U.S. Pat. No. 5,295,898 also owned by a common assignee of the present invention. Additionally, U.S. Pat. Nos. 5,407,384, 5,882,252 and U.S. Pat. No. 6,089,968, (referred to herein as "the '968 patent"), each owned by a common assignee to the present invention, disclose further devices for accomplishing the automatic removal of the loin from a full carcass middle. These devices are incorporated herein by reference for teachings regarding the general structure and operation of a "loin puller". It is an improvement over the device disclosed in the '968 patent that is described fully hereinafter. Further, U.S. Pat. No. 5,514,032, issued to Young et al., on May 7, 1996, and U.S. Pat. No. 5,580,306, issued to Young et al., on Dec. 3, 1996, disclose a loin separation apparatus and method of operation thereof. U.S. Pat. No. 3,771,196, issued to Doerfer et al., on Nov. 13, 1973, discloses a loin knife mechanism and an associated animal processing machine. U.S. Pat. No. 5,476,417, issued to Long et al., on Dec. 19, 1995, discloses a bent blade holder for receiving, bending and supporting a flexible blade in an automatic skinning machine for trimming a non-linear layer of unwanted material from a meat product. U.S. Pat. No. 5,334,084, issued to O'Brien et al, on Aug. 2, 1994, discloses a method and apparatus for automatically trimming fatty tissue from animal carcasses. U.S. Pat. No. 4,979,269, issued to Norrie, on Dec. 25, 1990, discloses a method and apparatus for separating back fat from loins. U.S. Pat. No. 4,974,290, issued to Cloninger, on Dec. 4, 1990, discloses a manually operated, mechanical loin knife. U.S. Pat. No. 5,090,939, issued to Leblanc, on Feb. 25, 1992, discloses an apparatus for trimming back fat off a pork loin. U.S. Pat. No. 3,546,737, issued to Neebel et al., on Dec. 15, 1970, discloses a loin pull and rib cut machine. And, U.S. Pat. No. 3,605,178, issued to Hoffman, on Sep. 20, 1971, discloses a manually operated loin knife.

The hoop, or U-shaped, configurations of the prior art create a high risk of scoring a loin portion of an animal carcass middle when the backfat is separated from the loin portion. Moreover, when the loin is separated from the belly portion prior to removing the backfat from the loin, overall yield is reduced because a portion of backfat, and the "fingers of lean" associated with the serratus dorsalis muscle, remain on the loin portion rather than on the belly portion where it has a greater value. It will be appreciated as well that separation of the loin portion of the carcass from the belly portion, and then subsequent removal of the skin and backfat from the loin portion are operations typically performed at separate stations.

While the '968 patent separates the belly and loin while maximizing belly yield by leaving the fingers of lean intact on the belly portion, the lade portions are not independently articulated. Accordingly, it is an object of the present invention to provide a dual blade automatic loin puller apparatus which increases the overall yield by separating the belly portion from the loin portion immediately prior to removing the backfat and skin from the loin while reducing the risk of scoring a loin portion of a carcass middle.

It is another object of the present invention to provide a dual blade automatic loin puller apparatus which separates the belly portion from the loin portion in a manner in which a greater portion of backfat, as well as fingers of lean remain intact on the belly portion, therefore increasing overall yield and which allows independent articulation of dual blades.

Other objects and advantages over the prior art will become apparent to those skilled in the art upon reading the detailed description together with the drawings.

BRIEF SUMMARY OF THE INVENTION

In accordance with the present invention, there is provided an apparatus for processing an animal carcass middle and for separating at least a loin and fatback portion thereof. The apparatus includes a frame for elevating a working surface a selected distance above a work support surface, with the frame supporting a loin separator assembly having at least two means for cutting attached thereto, a means for conveying the carcass middle toward the loin separator assembly, and a gripper assembly for gripping the carcass middle on the means for conveying. The loin separator assembly includes at least two means for cutting incorporating a first cutting blade having a z-shaped blade configuration so as to leave a shelf cut on a belly portion while a portion of "finger" lean on the loin portion. The z-shaped blade serves to separate the loin portion from the belly portion and cuts through virtually the entire length of "fingers of lean" of the carcass middle which include a portion of the serratus dorsalis muscle, leaving a portion of fingers of lean on the belly portion and the loin portion therefore increasing the amount of exposed lean meat on the fatback side of the belly portion. This increases the useable size of the belly cut of the carcass middle. The z-shaped blade is provided with a bight that is positioned on the z-shaped blade such that the upper bend of bight is proximate the kerf created by a scribe saw blade of the loin separator assembly. The loin separator assembly further includes a second cutting blade having a j-shaped blade configuration for removing a selected depth of skin and fatback from the loin portion subsequent to the above described removal of the belly portion. The j-shaped blade is positioned proximate the z-shaped blade such that the carcass middle first engages the z-shaped blade and then the j-shaped blade.

BRIEF DESCRIPTION OF THE SEVERAL VIEWS OF THE DRAWINGS

The features of the invention are more clearly understood from the following detailed description of the invention read together with drawings in which.

DETAILED DESCRIPTION OF THE INVENTION

Figure 1:
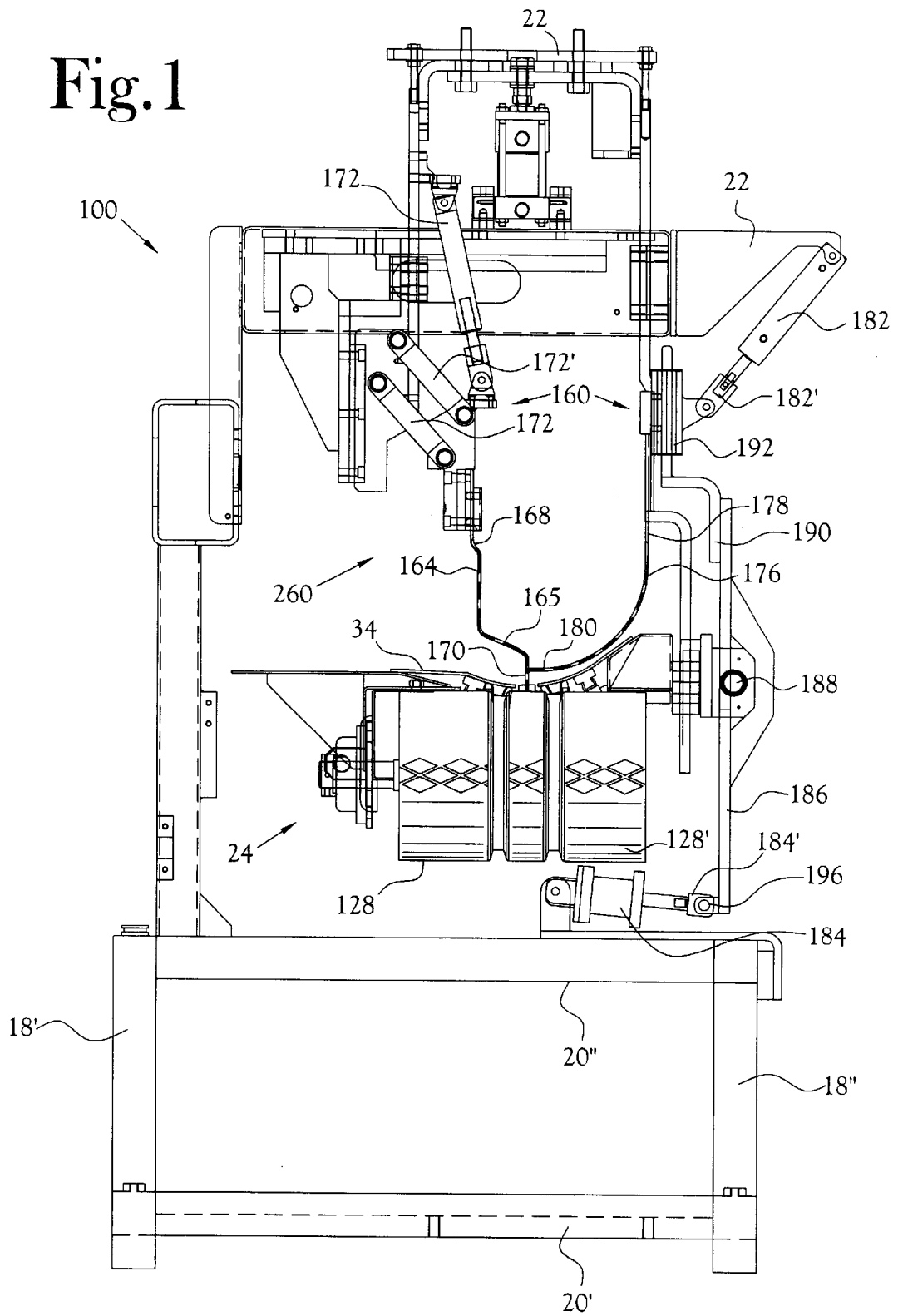
FIG. 1 illustrates an end view of a dual blade loin knife assembly of the present invention.
Figure 2A:
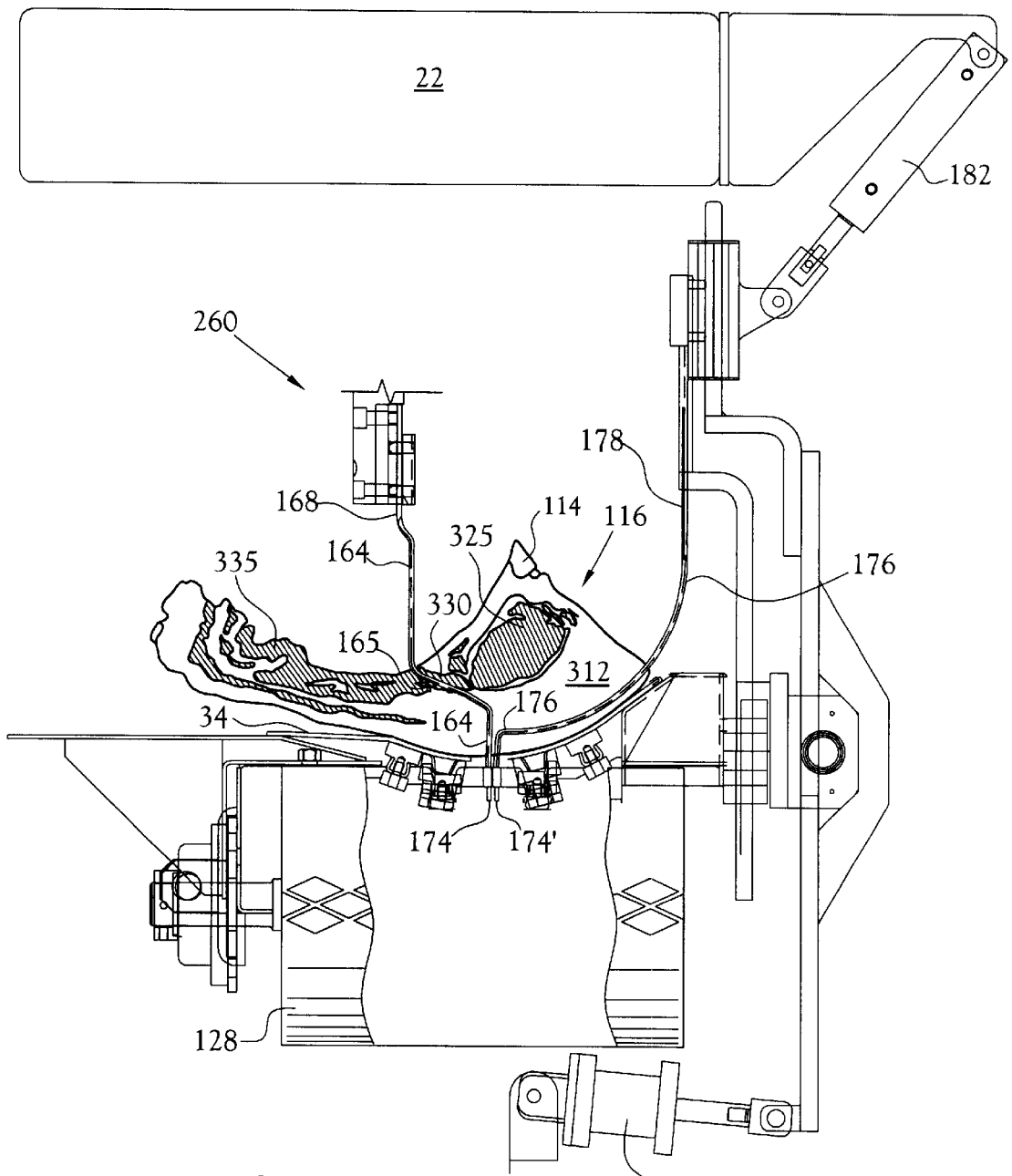
FIG. 2a is an enlarged view of the dual blade loin knife assembly shown in FIG. 1 with a carcass middle positioned for separation of a loin portion.
Figure 2B:
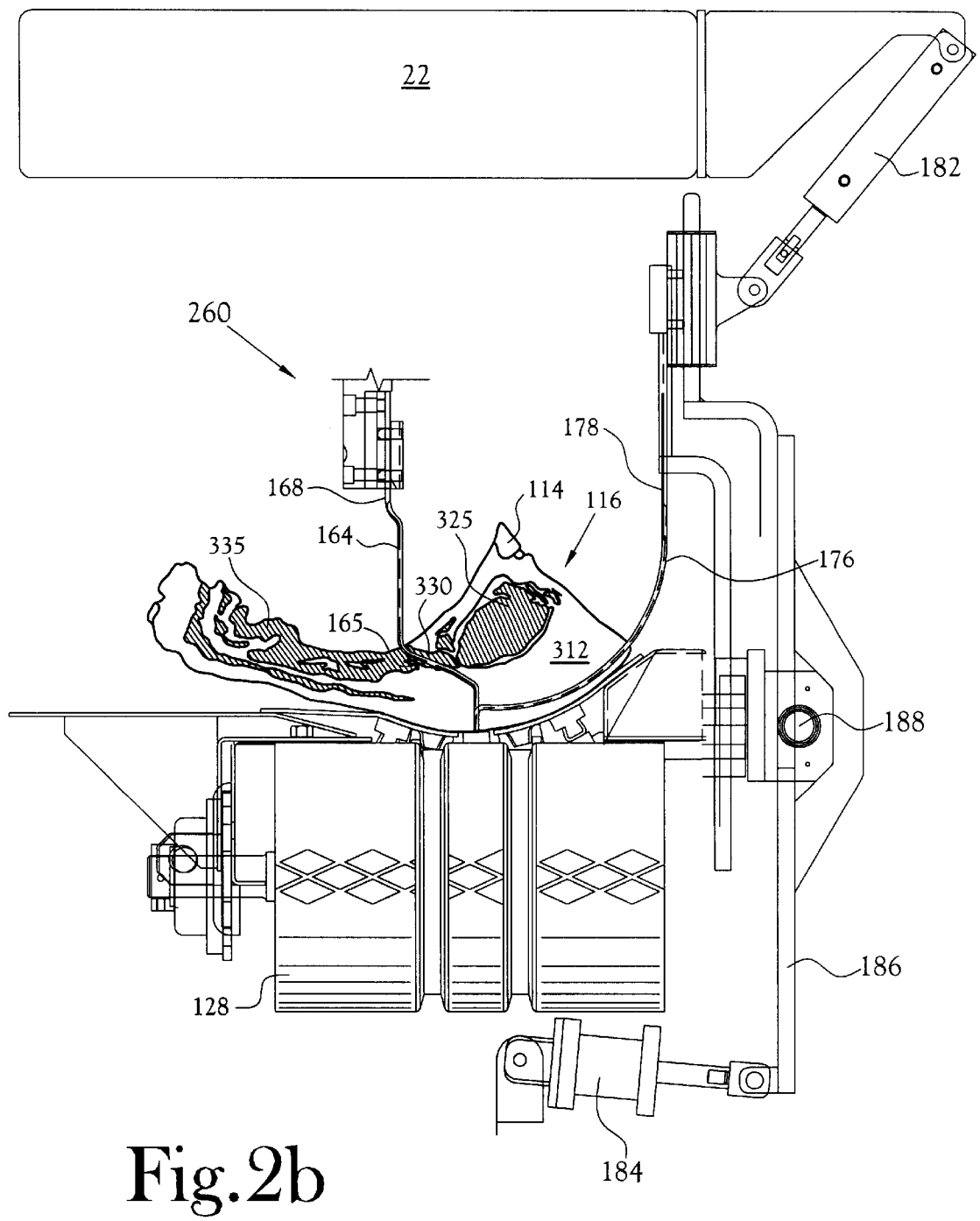
FIG. 2b is an enlarged view of the dual blade loin knife assembly shown in FIG. 2b, with a carcass middle positioned on a split conveyor.
Figure 3:
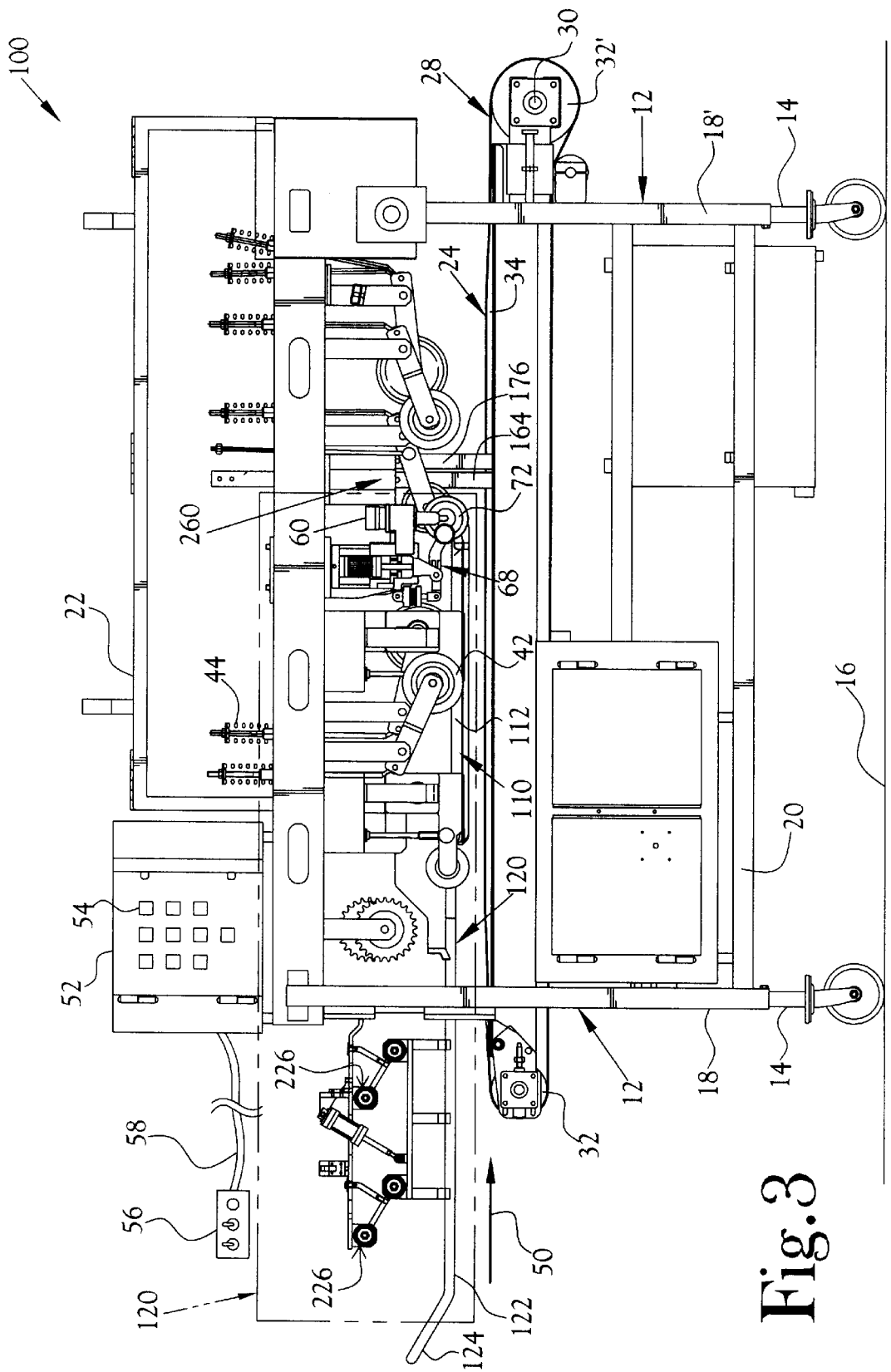
FIG. 3 illustrates a side elevation view of a loin puller assembly, including the dual blade loin knife assembly and an improved load bar assembly according to the present invention, some portions of the base apparatus being cut away for clarity of view.
Figure 6:
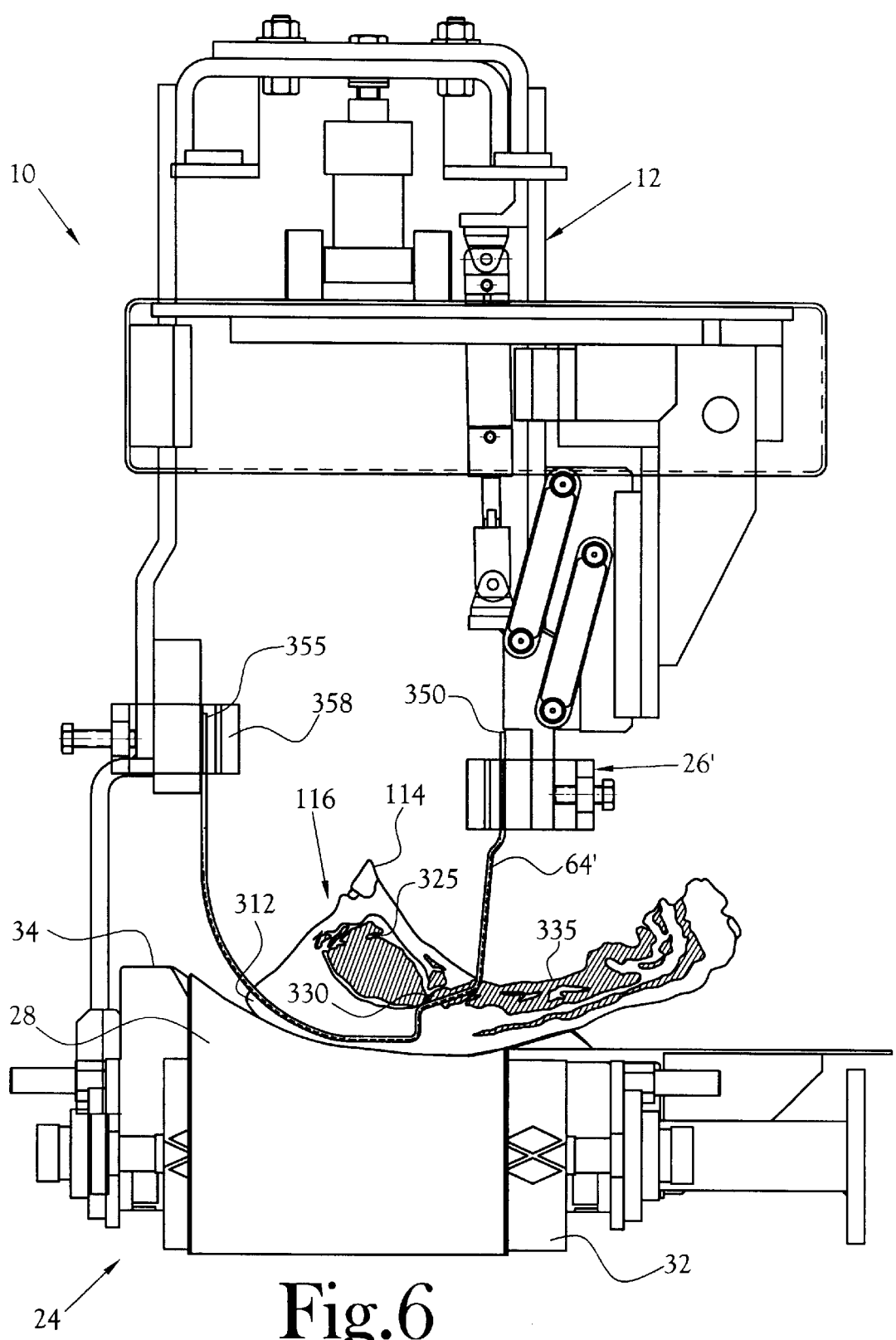
FIG. 6 illustrates an end view of the prior art loin puller's loin knife assembly with various components removed for clarity of illustration.
Figure 7:
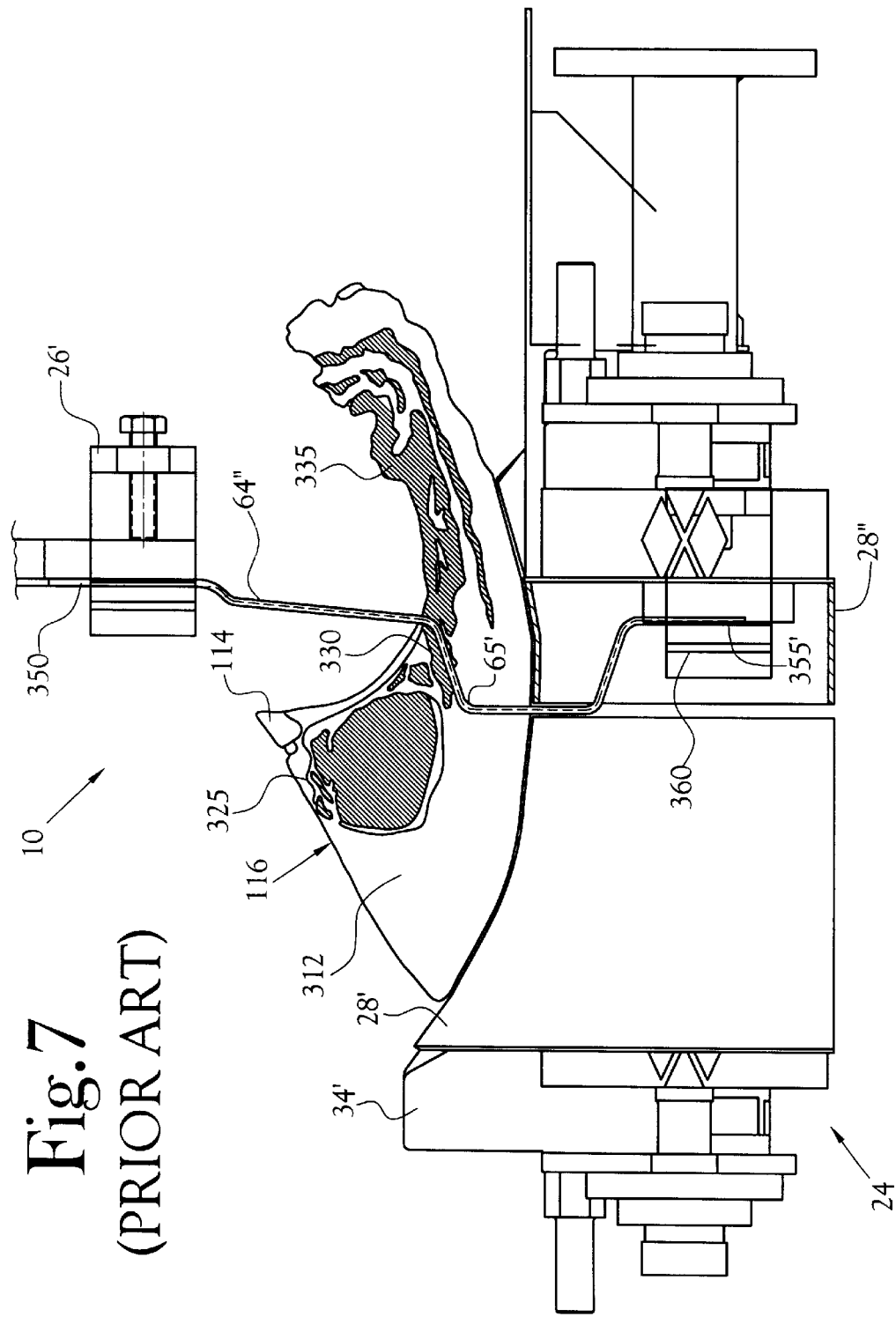
FIG. 7 illustrates a reverse end view of FIG. 6 of the prior art loin puller's loin knife assembly with various components removed for clarity of illustration.

The improvements of the present invention will be evident from review of a loin puller assembly 100 as illustrated in FIGS. 1, and 3, and from review of the dual blade loin knife assembly 260 of the present invention as illustrated in FIGS. 1, 2a, and 2b. The illustrated loin puller assembly 100, including the dual blade loin knife assembly 260, is a departure from that shown and described in the afore-cited '968 patent identified as prior art and illustrated in FIGS. 6 and 7.

Figure 8:
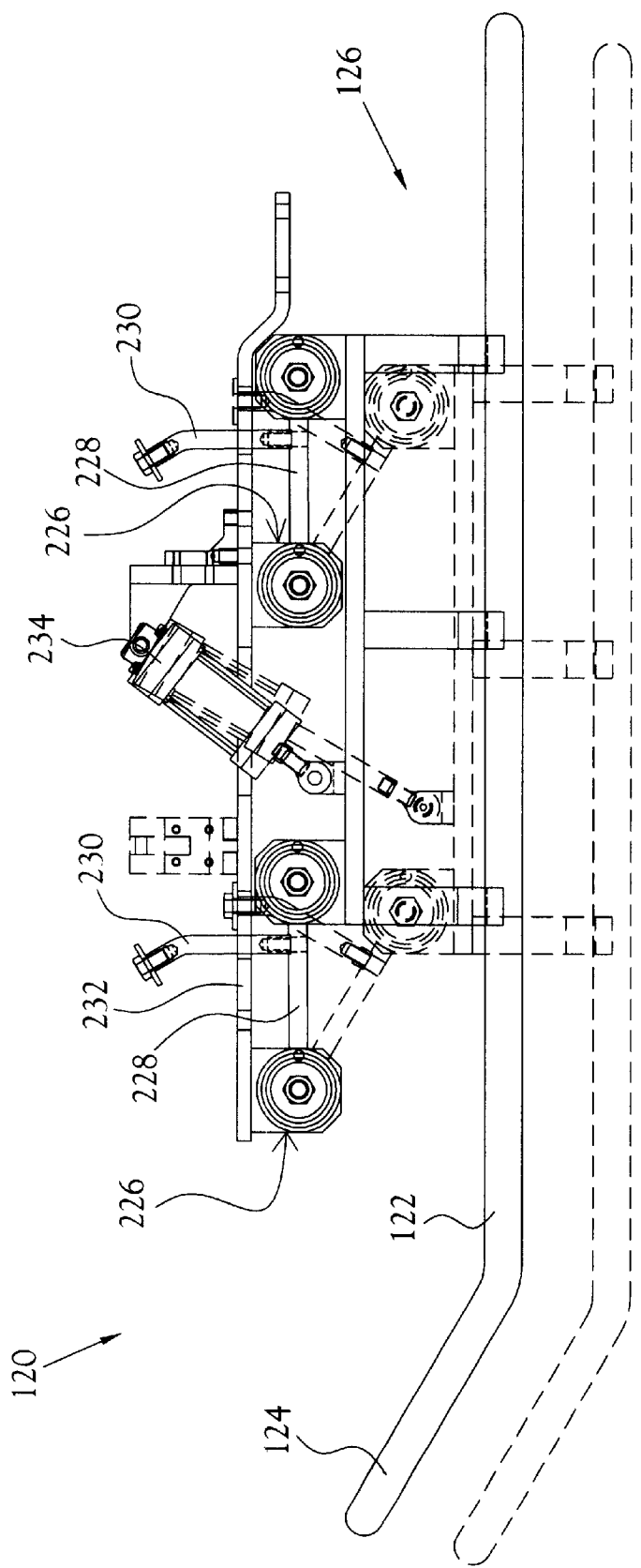
FIG. 8 illustrates a side view of an improved guide bar carriage assembly at its upper limit of travel showing the starting position in phantom in order to more clearly depict the range of motion.
Figure 9:
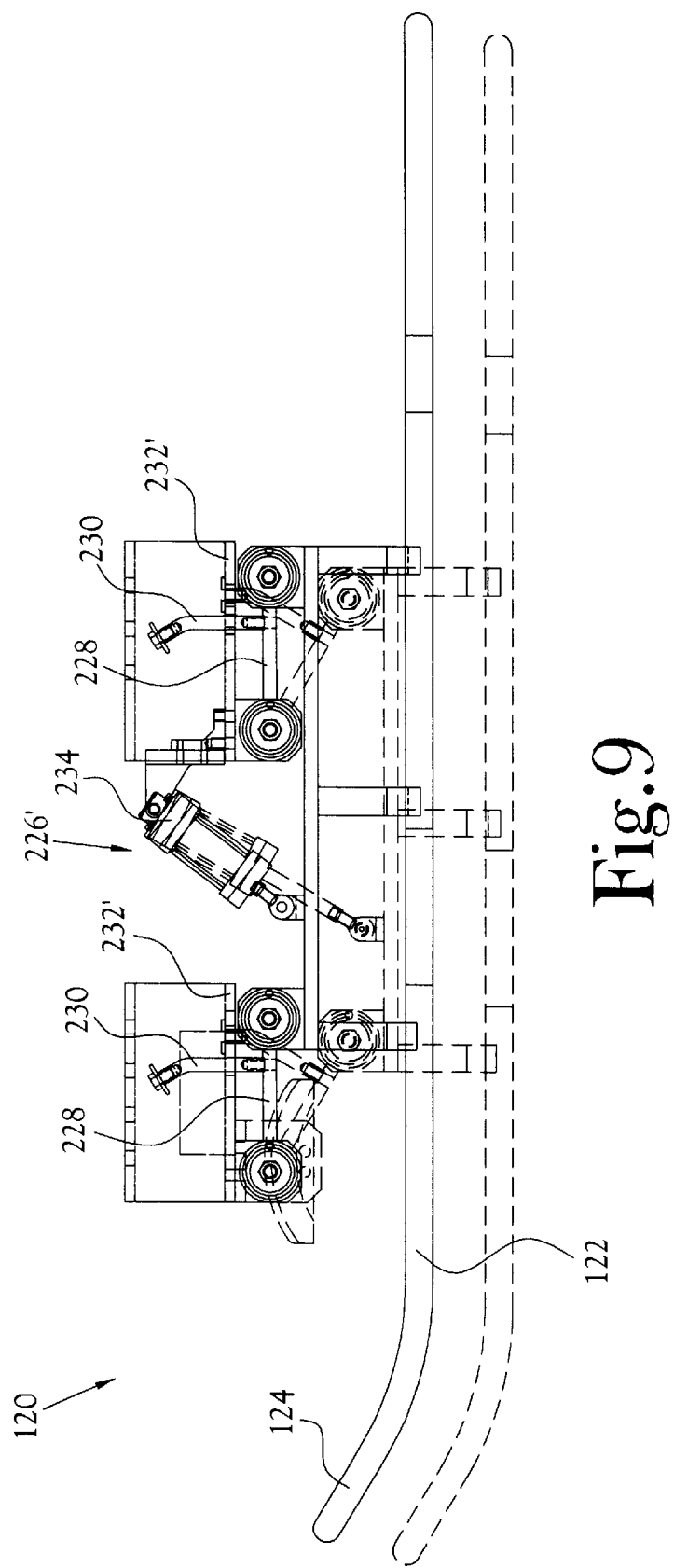
FIG. 9 illustrates a side view of the improved guide bar carriage assembly at its upper limit of travel showing the starting position in phantom in order to more clearly depict the range of motion.

As will be understood from review of the above-referenced U.S. Pat. Nos. 5,234,371, 5,295,898, 5,407,384, 5,882,252 and U.S. Pat. No. 6,089,968 ('968 patent), the prior art loin puller 10, illustrated in FIGS. 6 and 7, includes a frame 12 and a conveyor means 24 for conveying the carcass middle toward the loin knife assembly 26'. The conveyor means 24 includes a conveyor belt 28, driven by a motor (by any suitable interconnection), that runs on engagement, or drive wheels 32. The conveyor belt 28, in the area of support of a carcass middle, is substantially in contact with a work support surface 34, 34' (see FIGS. 6 and 7). Further, there is at least one, and preferably two, loin engagement means for advancing the carcass middle toward the loin knife assembly 26'. The loin engagement means for advancing is more fully described in our earlier patents, which are incorporated herein by reference. A load bar assembly 110 (see FIG. 3) is utilized for engaging the chine portion 114 of the carcass middle 116 in order to align the carcass middle 116 with a first loin knife 64' or 64" (see FIGS. 6 and 7). The load bar assembly 110 operates in cooperation with a guide bar assembly 120 (see FIG. 3) that engages the carcass middle 116 as it is loaded and aligned into the loin puller assembly 100. The general operation of the load bar assembly 110 and guide bar assembly 120 is more fully described in our earlier patents. With respect to the prior art single loin knife blade 64" (see FIG. 7) described in the '968 patent, the upper or proximal end 350 of the single loin knife blade 64" is secured to loin knife assembly 26' and is fully adjustable as to both latitudinal and longitudinal positioning depending upon the size of the loin loaded and aligned into the loin puller 10. The distal end 355' of single loin knife blade 64" is secured beneath the work surface of conveyor belt 28' (see FIG. 7). In order to facilitate passage of loin knife blade 64" through conveyor belt 28', conveyor belt 28' is part of a split conveyor belt system that includes first belt 28' and second belt 28" (see FIG. 7). Distal end 355' is secured at plate 360 so as to allow for adjustment of the latitudinal or longitudinal positioning of bite 65'. The improved guide bar 122 (see FIGS. 8 and 9) is carried by a pair of bracket assemblies 126 that are constructed so as to allow a guide bar 122 to travel freely in the vertical direction while substantially restricting and preventing lateral movement. Experience provides that the loin puller 10 described and claimed in the '968 patent, incorporating a single hoop blade 64' or 64", may present a greater risk of scoring the loin portion 325 of the carcass middle 116 during operation of the prior art loin puller 10. And, as described in the '968 patent, the single loin knife 64", that extends through the conveyor belt, does not remove the fatback from the loin. Further, it is desirable to limit the travel of the guide bar 122 to a range of motion that remains parallel to the work surface 34 and simultaneously allows approximately three inches of upwards travel, to accommodate different size carcass middles while simultaneously restricting forward motion to approximately three-quarters of an inch.

One Embodiment of The Invention

Accordingly, one embodiment of an improved loin puller assembly 100, includes a means for positioning 160 attached to a dual blade loin knife assembly 260 (see FIGS. 1, 2a, and 2b). In accordance with the teachings of the present invention, an improved loin puller assembly 100 as illustrated in FIGS. 1–3, includes a frame 12 that is provided with leg members 14 for supporting the same from a supporting surface such as a floor 16. Uprights 18, 18' and horizontal members 20 support the various components, and it will be understood that there are also a plurality of transverse members 20', 20" that are seen in FIG. 1. There is also an upper frame portion 22 that provides support for portions of the means for positioning 160. It will be recognized that the configuration depicted in the figures with regard to the frame 12 is so depicted for simplicity, and is not intended to limit the frame 12 to such a configuration. Further, there is a conveyor means 24 (see FIGS. 1 and 3) for conveying the carcass middle 116 toward the dual blade loin knife assembly 260. The conveyor means 24 includes a gripper assembly (not shown) for gripping the carcass middle 116 and for forcing the carcass middle against a split conveyor belt 128 (see FIG. 1).

The gripper assembly includes an impeller assembly (not shown) carried by the frame 12 for forcing the carcass middle 116 against the load bar assembly 110 and simultaneously driving the carcass middle 116 toward the first selected location, the impeller assembly having an impeller such as a chain having downwardly oriented teeth for engaging the chine portion 114 of the carcass middle 116, The impeller assembly includes a first motor for driving the impeller laterally towards the load bar and a second motor for rotatably driving the impeller whereby the chine portion of the carcass middle forcibly engages the load bar and the carcass middle is driven towards the first selected location for engagement with the dual blade loin knife assembly 260.

The split conveyor belt 128 includes dual belts 128 and 128', driven by a motor 30 (by any suitable interconnection), that runs on engagement, or drive wheels 32, 32' adapted, as more fully described in the '968 patent, to maintain a concentric relationship between motor 30 and drive wheel 32' The split conveyor belt 128, in the area supporting the carcass middle, is substantially in contact with a work surface 34. Further, there is at least one, and preferably two, means for engaging the carcass middle 116 including loin bar assembly 110 and guide bar assembly 120 for advancing the carcass middle 116 toward the dual blade loin knife assembly 260 (see FIG. 3).

Principal control of the loin puller assembly 100 is through a controller 52 which is preferably attached to the frame 12 (see FIG. 3). This contains operational switches 54 and elements to indicate the condition of operation. In addition, there is a portable auxiliary controller 56 connected to the main controller 52 through a cable 58 for use by an operator of the loin puller assembly 100. In the preferred embodiment, controller 52, the associated operational switches 54 and the auxiliary controller 56 would all be in electronic communication with a Programmable Logic Controller, ("PLC"), that would have selective control over the various operations of loin puller assembly 100. Progress of the carcass middle 116 through the loin puller assembly 100 and adjustments of the means for positioning 160 is monitored by a means for monitoring 130 including a vision camera 132 (see FIG. 5) for acquiring an image of the carcass middle 116.

Best Mode For Carrying Out The Invention

A major departure of the present invention from that shown and described in the above cited '968 patent (see FIG. 6 and FIG. 7), is a loin puller assembly 100 (see FIG. 1) including a guide bar assembly 120 and a dual blade loin knife assembly 260, as illustrated in FIGS. 1, 2a, 2b, and 3). The dual blade loin knife assembly 260 includes a first loin knife, referred to herein as a z-blade 164 and a second loin knife, referred to herein as a j-blade 176. The z-blade 164 is configured so as to separate the loin 325 from the belly portion 335 leaving the skin and fatback 312 intact on the loin portion 325. Regarding leaving the skin intact on loin portion 325, those skilled in the art will recognize that pork carcasses are finished with the skin intact on the carcass while beef carcasses are skinned prior to being cut into the primal cuts. Further, the z-blade 164 is configured so as to leave from about a 2 inch to about a 2⅝ inch shelf on the belly portion 335 incorporating an amount of "finger" lean while leaving a portion of finger lean 330 on loin portion 325. The z-blade 164 cuts through virtually the entire length of the "fingers of lean" which include a portion of the serratus dorsalis muscle, which increases the amount of exposed lean meat on the fatback side of the belly portion 335. This type of cut increases the useable size of the belly cut of the carcass middle 116. In this regard, the z-blade 164 is provided with a bight 165. Bight 165 is positioned on the z-blade 164 such that the upper bend of bight 165 is proximate the kerf created by a scribe saw assembly (not shown) aligned along the length of, and supported above, a middle portion of the split conveyor belt 128. The scribe saw assembly is mounted on the frame 12, is aligned with the conveyor belt 128, and includes a saw blade known to those skilled in the art for cutting through at least a portion of the carcass middle 116, providing a kerf cut of a selected depth, to allow the z-blade 164 of the dual blade loin knife assembly 260 to operate efficiently. A depth gauge assembly (not shown) is associated with the saw blade. The depth gauge assembly includes a depth gauge for decelerating the vertical movement of the saw blade as the saw blade moves vertically in a downward direction against the carcass middle 116, and for limiting the selected depth of the kerf created by the saw blade as the carcass middle 116 is moved along the split conveyor belt 128 toward the dual blade loin knife assembly 260.

The upper end 168 of the z-blade 164 is secured to the dual blade loin knife assembly 260 and is fully adjustable by the means for positioning 160 to a plurality of positions, by horizontal and vertical manipulation of the upper end 168 by at least one piston such as upper piston 172 and/or 172', so as to adjust either the depth or width of the z-blade cut. However, the lower end 170 of the z-blade 164 is secured beneath the work surface of the split conveyor belt 128 in one of a blade support slot 174, 174' (see FIG. 2a). The lower end 170 of the z-blade 164 is secured so as to allow adequate travel of the upper portions of the z-blade 164 to facilitate the above described adjustment of the depth and width of the cut. In order to obviate the need for hand finishing, or a separate finishing machine to remove the skin and fatback 312 from the separated loin portion, a separate blade identified as a j-blade 176 is positioned proximate the z-blade 164 such that, in the preferred embodiment, the carcass middle 116 engages the j-blade 176 subsequent to engagement of the z-blade 164. The j-blade 176 is a modified partial hoop blade that includes an upper end 178 secured in spaced relation apart from the upper end 168 of the z-blade 164. Further, the j-blade 176 includes a lower end 180 secured in the blade support slots 174, 174' proximate the lower end 170 of z-blade 164 in the blade support slot (see FIGS. 2a, 4a, 4b, and 4c).

Figure 4:
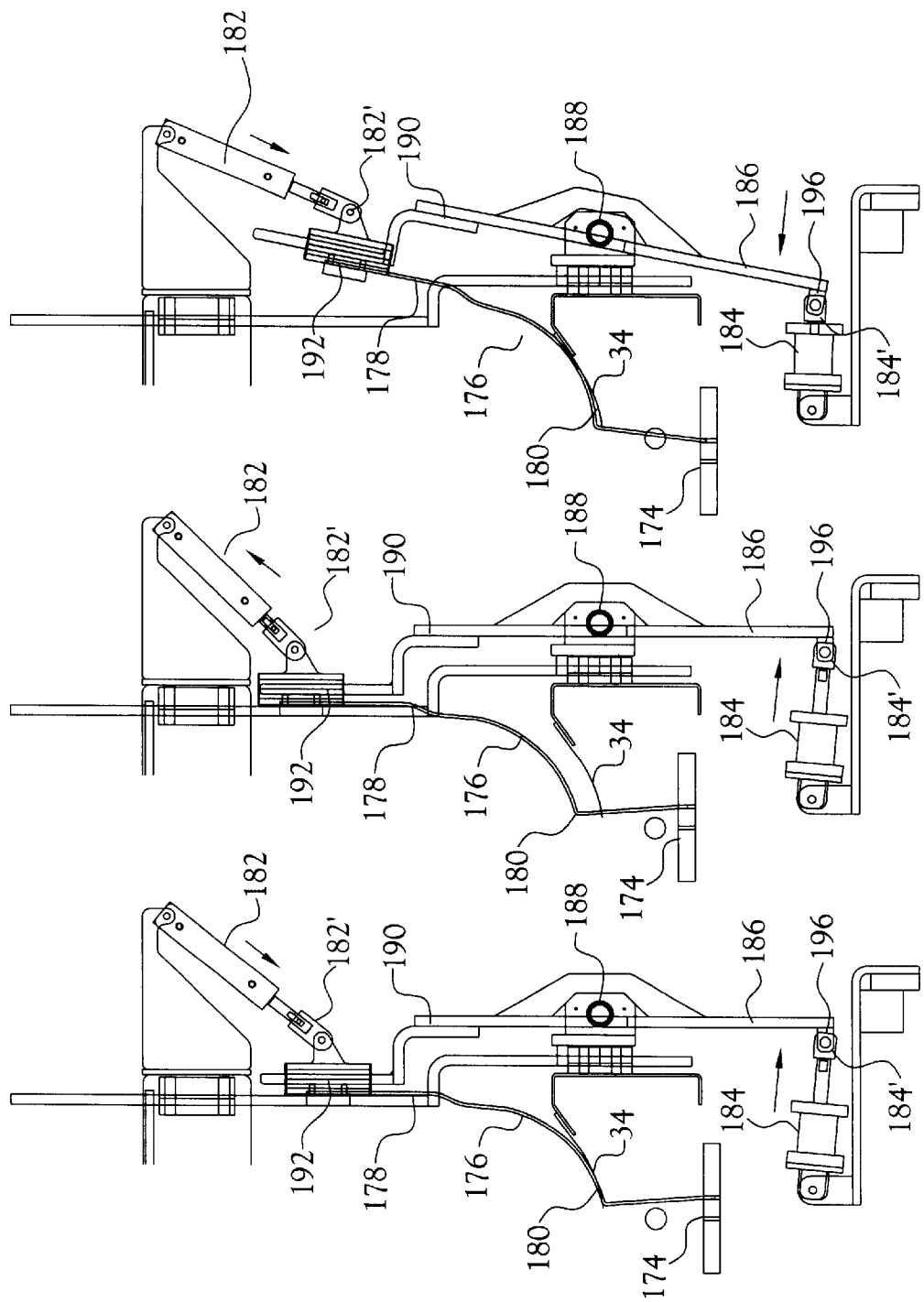
FIGS. 4a, 4b, and 4c are enlarged views of the second blade of the dual blade loin knife assembly shown in FIGS. 2a and 2b, showing a range of motion of either end of the second blade.

In the preferred embodiment, the j-blade 176 is actuated by an upper piston 182 in order to vary the thickness of the fatback removed from the loin (see FIG. 4a). A lower or follower piston 184 (see FIGS. 1 and 4a–c) is provided and secured below the working surface 34. Lower piston 184 assists upper piston 182 with horizontal and angular positioning of the j-blade 176 by providing manipulating control of the generally upright connecting arm 186 that connects the upper end 178 of the j-blade 176, with the lower piston 184 by way of a pivot support at about a midpoint 188 of the connecting arm 186. Control of the orientation of the j-blade 176 independent of control of the z-blade 164 is preferred in order to prevent the travel of the lower end 180 of the j-blade 176 from being impeded by the z-blade 164 or the weight of the loin. Additionally, the upper end 178 and the lower end 180 are actuated respectively by separate pistons 182, 184, so as to allow for adjustment of the radius of the cut of the j-blade 176 (see FIGS. 4a, 4b and 4c).

In the preferred embodiment, the j-blade 176 can be actuated in a vertical direction, a horizontal direction, and simultaneously in both directions to change the angular orientation of the cuts made by the j-blade 176. In this regard, it will be appreciated that in the preferred embodiment, vertical travel of the j-blade 176 is independent of horizontal travel. To provide structural support of the upper end 178 and lower end 180 of the j-blade 176, a generally upright connecting arm 186 connects the upper end 178 and the upper piston 182, with the lower piston 184, with a pivot support being at about a midpoint 188 of the connecting arm 186. The connecting arm 186 includes upper connector 190 attached to upper support member 192 that is attached to the j-blade upper end 178, and is attached to an extension portion 182' of upper piston 182. At a lower end of the connecting arm 186, a lower connector 196 is attached to an extension portion 184' of lower piston 184.

As illustrated in FIG. 4a, when upper piston extension portion 182' is extended downwards, while lower piston extension portion 184' is extended laterally, the j-blade 176 is moved toward the work surface 34 to cut through an outer perimeter of skin and fatback 312. As illustrated in FIG. 4b, when upper piston extension portion 182' is retracted upwards, while lower piston extension portion 184' is extended laterally, the j-blade 176 is moved away from the work surface 34 to cut through an inner portion of skin and fatback 312. As illustrated in FIG. 4c, when upper piston extension portion 182' is extended downwards, while lower piston extension portion 184' is retracted laterally, the j-blade 176 is moved in an angled orientation to vary the orientation of the cut through the skin and fatback 312.

In an alternate embodiment, a limit switch (not shown), is activated when the lower end 180 reaches the lower extent of its travel proximal to the work surface 34. The limit switch would cause respective pistons 182, 184 to activate, along with an additional piston underneath the work surface (not shown) to fire in order to increase the radius of the cut defined by the j-blade 176, by causing the lower end 180 to be extended upwardly (see FIG. 4b), in order to avoid cutting the ham end of the loin.

Figure 5:
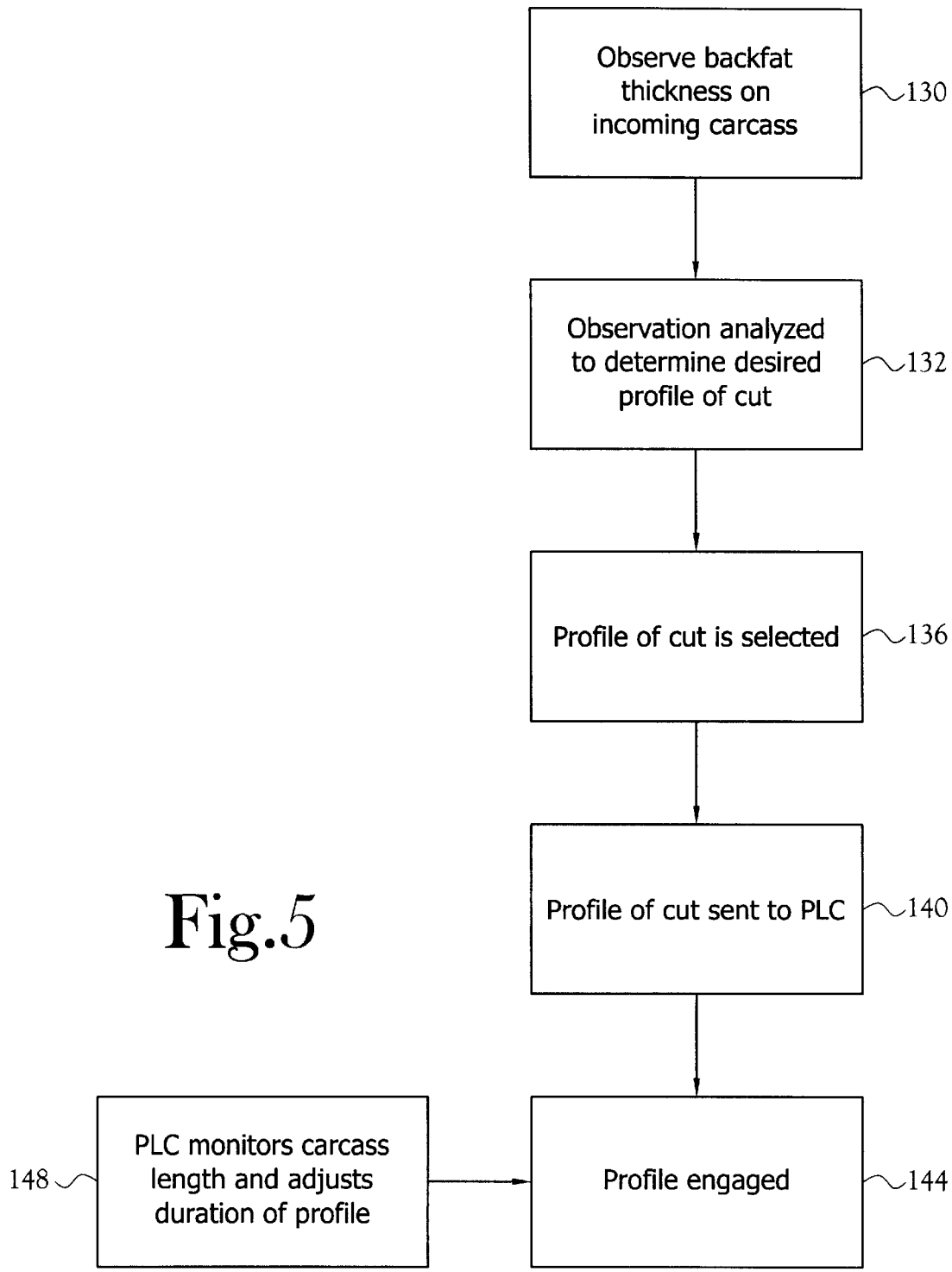
FIG. 5 illustrates a schematic flow chart of the operation and control of the loin puller apparatus.

Control of the selective positioning of the z-blade 164 and the j-blade 176 can either be manually, such as by use of auxiliary controllers 56 or can be computer controlled via the PLC. As illustrated in FIG. 5, the thickness of the backfat, on an incoming carcass, is observed at 130. This can be accomplished manually by a human operator, can by accomplished by a vision system that incorporates an optical sensor means such that at least one vision camerais utilized to take a sequence of snapshot images of the carcass middle 116 as the carcass middle progresses through the loin puller system 110. The sequence of snapshot images is digitized into sequential patterns with vision software 134, associated computer software, and computer hardware known to those skilled in the art, to provide analyses and comparisons of the digitized images from the least one vision camera 132 as the carcass middle 116 moves toward the z-blade 164 and the j-blade 176. Observation of backfat thickness at 130 could also be accomplished using an ultrasonic probe, or by a system utilizing a combination of an optical sensor and an ultrasonic probe.

Upon observing the backfat thickness, the observation is analyzed at 132, either by an operator or by digitizing the imagery and comparing the proportions to data stored in a database or other similar look-up table, or by algorithmic analysis, and at least one desired cut profile is determined. The desired profile is then selected at 136. In one embodiment, a plurality of profiles are stored in the PLC, and an operator can select which profile should be chosen based on the backfat thickness observed by the operator. The selected profile is communicated to the PLC at 140 and the profile is engaged by the PLC at 144.

It will be appreciated that in addition to the cut geometry of the profile, duration of the profile is a factor that must be taken in to consideration. In this regard, a long carcass will require a longer duration for a given profile than a short carcass having similar backfat thickness and similar proportions of loin cross-section to backfat thickness. In order to account for this factor, the PLC monitors carcass length at 148 in real time by means of mechanical sensors that detect the length of the carcass as the carcass travels through the loin puller apparatus towards the loin knife assembly. The positioning of the z-blade 164 and the j-blade 176 are independently adjusted by the means for positioning 160 based on the above described process as illustrated in FIG. 5. The profile trim cut calculated by the means for computing is transmitted to the means for positioning 160 for adjustments to the orientation of the z-blade 164 and j-blade 176 for proper trimming of the appropriate portions of the carcass middle 116.

As stated above, additional data regarding the desired and dynamic adjustment of the positioning of the z-blade 164 and the j-blade 176 while separating a loin portion is provided by the means of monitoring 130 incorporating an ultrasonic probe to sense tissue density in the carcass middle and thereby measure the width of the loin and the depth of the fatback throughout the length of the carcass middle. The ultrasonic probe may be utilized to provide real time adjustment of the z-blade 164 and the j-blade 176 and may be positioned beneath conveyor belt 128 in substantial alignment with the dual blade loin knife assembly 260. In this manner, the PLC associated with the controller 52 provides computer input to control the precise cut geometry through the full length of the carcass middle, by providing real-time adjustment of the depth and/or width of cut as the carcass middle 116 progresses through the z-blade 164 and the j-blade 176. It will be understood that the ultrasonic probe could be used as a sensor means in addition to the vision system and means for monitoring 130 or as an alternative method to the means for monitoring 130.

Further, in order to prevent any waste of the fatback proximate the upper end 178 of the j-blade 176, a vacuum pickup (not shown) can be mounted proximate the upper end 178 of the j-blade 176 in order to prevent loss of this material. It will be appreciated that the z-blade 164 and the j-blade 176 can each be provided with trailing edge serrations in order to reduce drag and to relieve the vacuum that created as the blades are pulled through the tissue, and especially through the fat, of carcass middle 116.

As described in greater detail in the '968 patent, a guide bar assembly 120 is also provided in the preferred embodiment to assist in aligning carcass middle 116 along a preferred direction 50 along guide bar 122, 124 to a load bar 112. Guide bar assembly 120 is carried by frame 12 and is located at the loading end of loin puller 10 proximate load bar assembly 110. Guide bar assembly 120 includes an elongated guide bar 122 that engages carcass middle 116 as carcass middle 116 is loaded into loin puller 10. In the preferred embodiment, guide bar 122 is provided with a bent free end 124. Guide bar 122 is carried by a pair of bracket assemblies 226 that are constructed so as to allow guide bar 122 to travel freely in the vertical direction while substantially restricting and limiting lateral movement. In this regard, bracket assemblies 226 include parallel bars 228 that are pivotally connected to the bracket assembly 226 and to the guide bar 122. Stop members 230 depend from the parallel bars 228 and engage bracket supports 232 and are adapted such that the guide bar travels approximately three inches vertically, while limiting the horizontal forward travel to a range of between about ¼" and about ¾". In the preferred embodiment, an air spring 234 biases the guide bar 122 in the downward position (see FIG. 8). In an alternative embodiment, additional bracket supports 232' are utilized for bracket assembly 226' (see FIG. 9).

It will be recognized by persons skilled in the art that there is a right-hand half of a carcass middle as well as a left-hand half. It will be recognized therefore, that equivalent mechanisms are provided for the left and right sides of a carcass.

From the foregoing, it will be understood by persons skilled in the art that a considerable improvement is made in loin puller apparatus such as that described in the afore-cited U.S. Pat. Nos. 5,234,371, 5,407,384, 5,882,252 and 6,089,968. This improvement includes providing dual loin knives, a z-blade and a j-blade in which the z-blade separates the loin portion from the belly portion while leaving about a 2 inch to about a 2⅝ inch shelf on the belly portion incorporating an amount of "finger" lean while leaving a portion of finger lean on loin portion and the j-blade separates a selected depth of fatback from the loin portion based on the desired profile.

Although specific reference is made to the pieces of equipment for a preferred embodiment, this is for the purpose of illustration rather than for limitation. It will be understood that it is not intended to limit the disclosure, but rather it is intended to cover all modifications and alternate methods falling within the spirit and the scope of the invention as defined in the appended claims.

Having thus described the aforementioned invention, We claim:

1. An apparatus for processing a carcass middle portion of an animal, and for separating at least the loin and fatback portion thereof, comprising:
   a working surface onto which the carcass middle is positioned, said working surface supported by a frame above a support surface;
   a dual blade loin knife assembly carried by said frame at a first selected location on said frame, said dual blade loin knife assembly providing a plurality of cuts on the carcass middle,
   a means for positioning said dual blade loin knife assembly providing adjustment of depth and width of said plurality of cuts made on the carcass middle by said dual blade loin knife assembly;
   a means for conveying carried by said frame for conveying the carcass middle toward said first selected location to engage said dual blade loin knife assembly, said conveying means having a working surface for engaging the carcass middle; and
   a gripper assembly carried by said frame for gripping the carcass middle and forcing the carcass middle against said conveying means and toward said first selected location;
   whereby said dual blade loin knife assembly provides cuts on the carcass middle as the carcass middle is moved by said conveying means past said first selected location on said frame.

2. The apparatus of claim 1, further comprising:
   a scribe saw assembly mounted on said frame such that said scribe saw assembly moves vertically and laterally, said scribe saw assembly having a saw blade for cutting a kerf having a selected depth through at least a portion of the carcass middle, said scribe saw assembly provided with means for positioning said saw blade in alignment with dual blade loin knife assembly, whereby said dual blade loin knife assembly passes through the carcass middle along said kerf created by said saw blade; and
   a means for monitoring the carcass middle during movement of the carcass middle by said conveying means through said dual blade loin knife assembly, said monitoring means including a vision system that scans the carcass middle and produces a sequence of images of the carcass middle as the carcass middle progresses through said dual blade loin knife assembly.

3. The apparatus of claim 2, wherein said apparatus further comprising:
   a load bar assembly carried by said frame at a second selected position having an elongated load bar for engaging a chine portion of the carcass middle and for aligning the carcass middle in a selected alignment with said dual blade loin knife assembly;
   a guide bar assembly carried by said frame proximate said load bar assembly, said guide bar assembly having an elongated guide bar for engaging the carcass middle as the carcass middle is positioned on said means for conveying carried by said frame, said guide bar being in substantial alignment with said load bar, whereby said guide bar aligns the carcass middle with said load bar; and
   an impeller assembly carried by said frame for forcing the loin and fatback portion and the chine portion of the carcass middle against said load bar and simultaneously driving the carcass middle toward said first selected location on said frame, said impeller assembly including:
   an impeller for engaging the carcass middle;
   a first motor for driving said impeller and carcass middle laterally against said load bar; and
   a second motor for rotatably driving said impeller whereby the chine portion of the carcass middle forcibly engages said load bar and the carcass middle is driven towards said first selected location.

4. The apparatus of claim 3, wherein said elongated load bar has an inverted channel and wherein one of said chain members registers with said inverted channel.

5. The apparatus of claim 3, wherein said impeller is defined by an endless drive consisting of a plurality of hingedly interlocking links rotating about at least first and second sprockets, and wherein said impeller assembly further comprises a pressure block for providing a support for said interlocking links as said interlocking links engage the carcass middle; a fluid-driven cylinder connected to one of said sprockets for maintaining tension on said endless drive; and at least one carcass middle gripping projection carried by said interlocking links.

6. The apparatus of claim 3, wherein said impeller is defined by a rotatably driven drum and wherein said impeller assembly further comprises a fluid-driven cylinder connected to said drum for driving said drum laterally towards said load bar; and a plurality of carcass middle gripping projections carried by said drum.

7. The apparatus of claim 1, wherein said dual blade loin knife assembly including at least two loin knife blades carried by said dual blade loin knife assembly, each of said loin knife blades having a proximal end, a distal end, a cutting edge and a trailing edge, said at least two loin knife blades disposed to sequentially engage the carcass middle, said at least two loin knife blades including:

a first cutting blade carried by said frame proximate said first selected location, said first cutting blade being disposed a selected distance above said working surface to define a depth of cut, said first cutting blade defining a selected cutting contour for separating the loin and fatback portion from the carcass middle; a second cutting blade carried by said frame proximate said first selected location, said second cutting blade being disposed a second selected distance above said conveyor to define a second depth of cut, said second cutting blade defining a second cutting contour for separating the loin from the fatback portion.

8. The apparatus of claim 1, wherein said gripper assembly includes a plurality of chain members and at least two sprocket members carrying said chain members, said chain members having chain links defining an endless loop configuration engaged with said sprocket members, a portion of said chain links carrying extended portions to engage the carcass middle, said chain members being moved to assist in moving the carcass middle toward said dual blade loin knife assembly, and said gripper assembly further includes means for biasing each of said chain members toward the carcass middle, said biasing means including at least one idler wheel positioned against said chain members and spring biasing means interposed between said idler wheel and said frame.

9. An apparatus for processing a carcass middle portion of an animal, and for separating at least the loin and fatback portion thereof, comprising:

a working surface onto which the carcass middle is positioned, said working surface supported by a frame above a support surface;

a dual blade loin knife assembly carried by said frame at a first selected location on said frame, said dual blade loin knife assembly providing a plurality of cuts on the carcass middle, said dual blade loin knife assembly including at least two loin knife blades carried by said dual blade loin knife assembly, each of said loin knife blades having a proximal end, a distal end, a cutting edge and a trailing edge, said at least two loin knife blades disposed to sequentially engage the carcass middle, said at least two loin knife blades including;

a first cutting blade carried by said frame proximate said first selected location, said first cutting blade being disposed a selected distance above said working surface to define a depth of cut, said first cutting blade defining a selected cutting contour for separating the loin and fatback portion from the carcass middle, said first cutting blade further defined by a z-blade, said z-blade adapted to engage the carcass middle so as to leave a shelf cut therein, said z-blade including a bight positioned and configured so as to pull a loin portion from the carcass middle with the fatback portion intact and further so as to leave a shelf of a selected depth on a remaining belly portion of the carcass middle that incorporates a selected amount of finger lean while leaving a portion of finger lean on the loin portion;

a second cutting blade carried by said frame proximate said first selected location, said second cutting blade being disposed a second selected distance above said conveyor to define a second depth of cut, said second cutting blade defining a second cutting contour for separating the loin from the fatback portion, said second cutting blade further defined by a j-blade, said j-blade adapted to engage the carcass after said z-blade engagement of the carcass said apparatus for processing a carcass middle portion of an animal further comprising a means for positioning said dual blade loin knife assembly providing adjustment of depth and width of said plurality of cuts made on the carcass middle by said dual blade loin knife assembly;

a means for conveying carried by said frame for conveying the carcass middle toward said first selected location to engage said dual blade loin knife assembly, said conveying means having a working surface for engaging the carcass middle; and a gripper assembly carried by said frame for gripping the carcass middle and forcing the carcass middle against said conveying means and toward said first selected location;

whereby said dual blade loin knife assembly provides cuts on the carcass middle as the carcass middle is moved by said conveying means past said first selected location on said frame.

10. The apparatus of claim 9, wherein said distal end of said z-blade is secured to a first positioning means of said means for positioning attached to said frame at a first position above said working surface, and said distal end of said j-blade is secured to a second positioning means of said means for positioning attached to said frame, said second positioning means positions disposed in an angled position laterally adjacent said first position of said first positioning means above said working surface.

11. The apparatus of claim 10, wherein said distal end of each of said z-blade and said j-blade is secured proximate said working surface and secured to said frame below said working surface of said conveying means, and wherein said conveying means is split so as to allow said distal end of each of said z-blade and said j-blade to pass separately through said working surface.

12. The apparatus of claim 11, wherein each of said z-blade and said j-blade further comprising blade surfaces for providing vacuum relief respectively between each of said z-blade and said j-blade and the tissue of the carcass middle, said blade surfaces for providing vacuum relief are defined by a plurality of serrations provided on a trailing edge of each of said z-blade and said j-blade.

13. A loin separator assembly for an automatic apparatus for processing an carcass middle and separating at least a loin portion and a fatback portion thereof, said loin separator assembly comprising:

a frame for elevating a working surface a selected distance above a support surface, said frame having a first end and a second end;

a dual blade loin knife assembly connectable to said frame above said working surface, said dual blade loin knife assembly including:

a z-shaped blade adapted to engage the carcass middle, said z-shaped blade having a proximal end, a distal end, a cutting edge, and a trailing edge;

a j-shaped blade adapted to engage the carcass middle after said z-shaped blade engagement of the carcass, said j-shaped blade having a proximal end, a distal end, a cutting edge, and a trailing edge;

a bight on said z-shaped blade being positioned and configured so as to pull the loin portion from the carcass middle with the fatback portion intact and further so as to leave a shelf of a selected depth on a remaining belly portion of the carcass middle that incorporates a selected amount of finger lean while leaving a portion of finger lean of a selected depth on the loin portion; and a means for positioning of said dual blade loin knife assembly, said means for positioning attachable said frame, said means for positioning including independently configured first positioning means for positioning said z-shaped blade, and second positioning means for positioning said j-shaped blade for independently adjusting the depth and width of cuts of said z-shaped blade and said j-shaped blade.

14. The loin separator assembly of claim 13, wherein said z-shaped blade and said j-shaped blade further comprise a plurality of members positioned on said trailing edge of each blade for providing vacuum relief between said respective blades and the tissue of the carcass middle, said plurality of members defined by a plurality of serrations provided on said trailing edge of each blade.

15. The loin separator assembly of claim 13, wherein said bight includes a substantially horizontal portion for cutting through a substantial length of fingers of lean, said fingers of lean including a portion of a serratus dorsalis muscle, and a substantially vertical portion for extending through the fatback portion of the carcass middle.

16. An apparatus for processing a carcass middle of an animal, and separating at least a loin portion and a fatback portion thereof, comprising:

a frame for elevating a working surface a distance above a support surface;

a loin separator knife assembly carried by said frame at a first selected location, said loin separator knife assembly including a dual blade loin knife assembly providing for adjustment of depth and width of cuts made on the carcass middle by said dual blade loin knife assembly;

a conveying assembly carried by said frame having a conveyor belt for conveying the carcass middle toward said first selected location to engage said dual blade loin knife assembly, said conveying assembly including said conveyor belt having a working surface for engaging the carcass middle;

a load bar assembly carried by said frame at a second selected position having an elongated load bar for engaging a chine portion of the carcass middle and for aligning the carcass middle in a selected alignment with said dual blade loin knife assembly;

a guide bar assembly carried by said frame proximate said load bar assembly having an elongated guide bar for engaging the carcass middle as the carcass middle engages said apparatus, said guide bar being in substantial alignment with said load bar, whereby said guide bar aligns the carcass middle with said load bar;

an impeller assembly carried by said frame for forcing the carcass middle against said load bar and simultaneously driving the carcass middle toward said first selected location, said impeller assembly having an impeller for engaging the chine portion of the carcass middle, a first motor for driving said impeller laterally towards said load bar and a second motor for rotatably driving said impeller whereby the chine portion of the carcass middle forcibly engages said load bar and the carcass middle is driven towards said first selected location;

a gripper assembly carried by said frame for gripping the carcass middle and forcing the carcass middle against said conveyor belt and toward said first selected location;

a scribe saw assembly mounted on said frame such that said scribe saw assembly moves vertically and laterally, said scribe saw assembly having a saw blade for cutting through at least a portion of the carcass middle, whereby a kerf of a selected depth is created, said scribe saw assembly provided with means for positioning said saw blade in alignment with said dual blade loin knife assembly, whereby dual blade loin knife assembly passes through the carcass middle at said kerf created by said saw blade;

a sensor means for detecting the carcass middle and for actuating horizontal and vertical movement of said dual blade loin knife assembly, said sensor means being carried by said frame proximate said dual blade loin knife assembly; and means for calculating the preferred depth of cut of said dual blade loin knives, said means for calculating includes means for adjusting the orientation of each cut of said dual blade loin knives.

17. The apparatus of claim 16, wherein said gripper assembly includes a plurality of chain members and at least two sprocket members carrying said chain members, said chain members having chain links defining an endless loop configuration engaged with said sprocket members, a portion of said chain links carrying extended portions to engage the carcass middle, said chain members being moved to assist in moving the carcass middle toward each of said dual blade loin knife assembly, said apparatus further comprises means for biasing each of said chain members toward the carcass middle, said biasing means including at least one idler wheel positioned against said chain members and spring biasing means interposed between said idler wheel and said frame.

18. The apparatus of claim 16, wherein said impeller is defined by an endless drive consisting of a plurality hingedly interlocking links rotating about at least first and second sprockets and wherein said impeller assembly further comprises a pressure block for providing a support for said links as said links engages the carcass middle; a fluid-driven cylinder connected to one of said sprockets for maintaining tension on said endless drive; and at least one carcass middle gripping projection carried by said interlocking links.

19. The apparatus of claim 16, wherein said impeller is defined by a rotatably driven drum and wherein said impeller assembly further comprises a fluid-driven cylinder connected to said drum for driving said drum laterally towards said load bar; and a plurality of carcass middle gripping projections carried by said drum.

20. The apparatus of claim 16, wherein said dual blade loin knife assembly including at least two loin knife blades carried by said dual blade loin knife assembly, each of said at least two loin knife blades including a proximal end, a distal end, a cutting edge, and a trailing edge, said cutting edge of a first blade having a bight thereon, said bight includes a substantially horizontal portion positioned for cutting through said carcass middle so as to pull a loin portion from the carcass middle with the fatback portion intact and further so as to leave a shelf of a selected depth on a remaining belly portion of the carcass middle that incorporates a selected amount of finger lean while leaving a portion of finger lean on the loin portion, and members on each knife blade for providing vacuum relief between each of said two loin knife blades and the tissue of the carcass middle; said distal end of each of said two loin knife blades is secured to said frame below said working surface of said conveyor belt, and said conveyor belt is split so as to allow said at least two loin knife blades to pass through said working surface.

* * * * *